(12) United States Patent  (10) Patent No.: US 6,288,853 B1
Kamada                     (45) Date of Patent:    Sep. 11, 2001

(54) OPTICAL PICKUP DEVICE

(75) Inventor: Toru Kamada, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 09/649,011

(22) Filed: Aug. 28, 2000

(30) Foreign Application Priority Data

Aug. 27, 1999 (JP) .................................................. 11-242298

(51) Int. Cl.$^7$ ....................................................... G02B 7/02
(52) U.S. Cl. ........................... 359/823; 359/814; 359/824
(58) Field of Search ................................... 359/813, 814, 359/822, 823, 824; 369/44.14, 44.17

(56) References Cited

U.S. PATENT DOCUMENTS

| | | | |
|---|---|---|---|
| 4,687,296 | * | 8/1987 | Terayama et al. .................... 359/814 |
| 5,182,738 | * | 1/1993 | Yoshikawa ......................... 369/44.14 |
| 5,815,328 | * | 9/1998 | Makita .................................. 359/824 |
| 5,901,133 | * | 5/1999 | Miyamae et al. ..................... 369/247 |
| 5,920,437 | * | 7/1999 | Shirotori .............................. 359/824 |

FOREIGN PATENT DOCUMENTS

| | | | | |
|---|---|---|---|---|
| 3-104026-A | * | 5/1991 | (JP) | ................................. G22B/7/09 |
| 6-79383 | | 10/1994 | (JP) | ................................. G11B/7/09 |

\* cited by examiner

*Primary Examiner*—Ricky Mack
(74) *Attorney, Agent, or Firm*—Sughrue, Mion, Zinn, Macpeak & Seas, PLLC

(57) ABSTRACT

A magnetic piece 23 is provided in the almost central portion of a magnet 18 in a tracking direction. Therefore, the magnetic piece 23 is attracted to the almost central portion of the magnet 18 by the magnetic attraction of the magnet 18 and is held therein. In addition, when a lens holder 15 is set in a neutral position in a focusing direction, the magnetic pieces 23 are provided in the vicinity of both edge portions in the focusing direction of the magnet 18, respectively. Consequently, the lens holder 15 is held in the balance position of the magnetic attractions for both magnetic pieces 23.

6 Claims, 4 Drawing Sheets

OPTICAL PICKUP DEVICE

BACKGROUND OF THE INVENTION

The present invention relates to a so-called shaft sliding type optical pickup device.

A related shaft sliding type optical pickup device is disclosed in Japanese Patent Publication No. 6-79383B. In such an optical pickup device; a lens holder holding an objective lens is attached rotatably and slidably to a support shaft mounted on a frame and a driving coil is attached to the lens holder and a member on one of sides of the frame, and a magnet is fixed to a member on the other side opposite to the driving coil in a radial direction. A control current is sent in a proper timing with respect to the driving coil. Consequently, the whole lens holder including the objective lens is controlled and moved in a focusing direction (an axial direction) and a tracking direction (a rotating direction).

In such a related shaft sliding type optical pickup device, a magnet for focusing and a magnet for tracking are required. In the related device described, a single magnet 1 is polarized and magnetized (double-pole magnetized) in the focusing direction (vertical direction) and the tracking direction (transverse direction) as shown in FIG. 5.

On the other hand, a magnetic piece 2 is attached to the lens holder opposite to the magnet 1 as shown in FIG. 6, for example. The magnetic piece 2 is provided in a magnetic circuit using the magnet 1. Thus, a magnetic spring structure is constituted. Consequently, the objective lens is held in each of neutral positions in the focusing direction and the tracking direction.

Such a related device has two kinds of magnets 1, that is, a magnet for focusing and a magnet for tracking. Therefore, driving coils should be provided to face the magnets, respectively. For this reason, a reduction in a size and thickness is impeded. On the other hand, in the case in which two kinds of magnets are shared as a single magnet, the arrangement of the magnetic piece becomes a problem.

SUMMARY OF THE INVENTION

It is an object of the invention to provide an optical pickup device capable of obtaining an excellent magnetic spring structure also in the case in which two kinds of magnets are shared as a single magnet.

In order to achieve the above object, according to the present invention, magnetic pieces are provided in the vicinity of both edge portions in the focusing direction of the magnet respectively. Thus, the lens holder is held in the neutral position in which the magnetic attractions for both magnetic pieces are balanced. On the other hand, the magnetic pieces are provided in the almost central portion of the magnet in the tracking direction (rotating direction). Therefore, the magnetic piece is attracted by a magnetic attraction and is held in the almost central portion of the magnet which is the closest to the magnet in the locus of the tracking movement (rotation) of the magnetic piece.

In particular, when the magnetic piece on one of the sides gets out of the facing region of the magnet and the magnetic piece on the other side enters an facing region on the central side of the magnet during a control operation in the focusing direction, a great magnetic attraction acts on the magnetic piece on one of the sides which gets out of the facing region of the magnet. Consequently, the whole lens holder is stably returned to a neutral position by the action force. The lens holder cannot be returned to the neutral position only by the magnetic piece on the other side which enters the facing region on the central side of the magnet.

In order to attain the advantageous effect, preferably, each of the magnetic pieces is arranged such that an end portion thereof in the focusing direction is almost coincident with the end portion in the focusing direction of the magnet when the lens holder is held in the neutral position.

Alternatively, each of the magnetic pieces is arranged such that a central portion thereof in the focusing direction is almost coincident with the end portion in the focusing direction of the magnet when the lens holder is held in the neutral position.

If each of the magnetic pieces is arranged so as to face the magnet within a whole control movement range in the focusing direction, the return force into the neutral position is always maintained to be almost equal. Therefore, it is possible to obtain a very stable focusing control operation.

If it is configured that an interval of the magnetic pieces in the focusing direction is determined in accordance with a desired magnetic spring characteristic, it is possible to easily obtain an appropriate configuration corresponding to various conditions of the device to be used.

DETAILED DESCRIPTION OF THE PREFERRED EMBODIMENTS

An embodiment of the invention will be described below with reference to the drawings.

Figure 1:
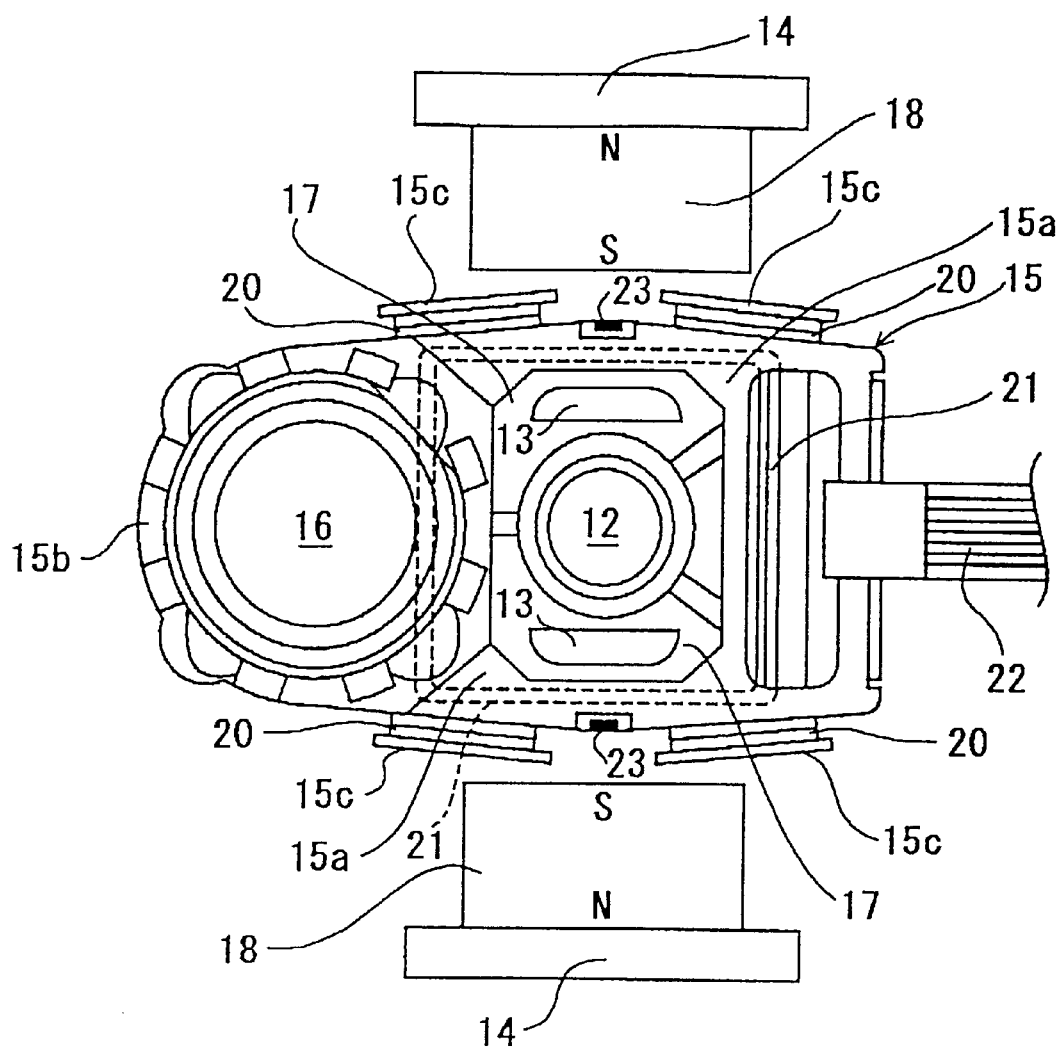
FIG. 1 is a plan view illustrating the structure of an optical pickup device according to an embodiment of the invention.
Figure 2:
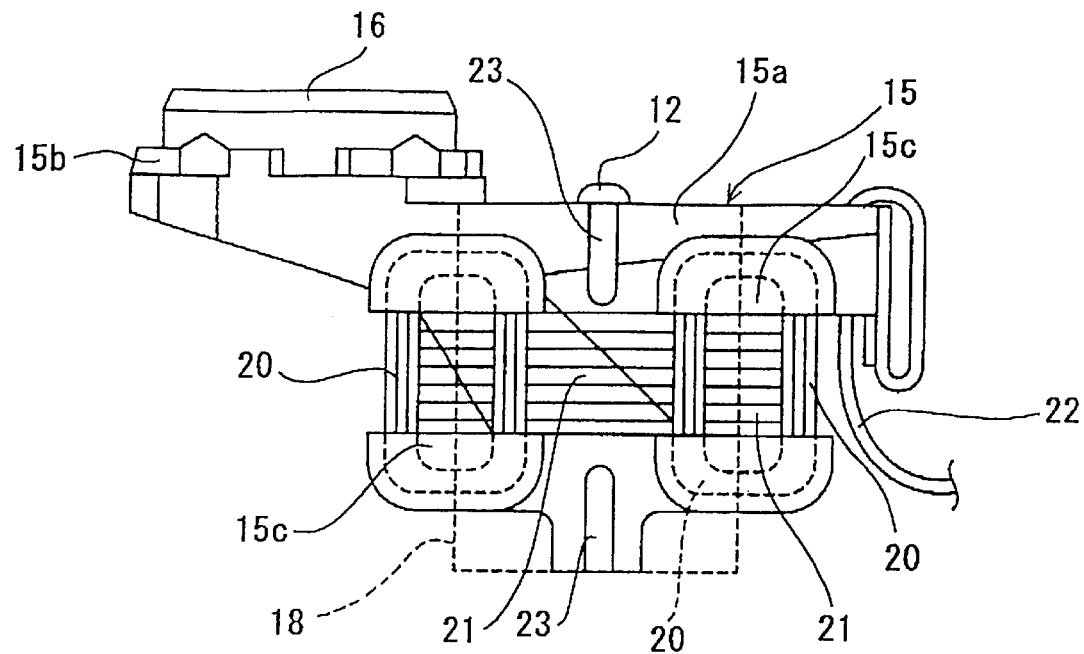
FIG. 2 is a side view illustrating the structure of the optical pickup device according to the embodiment of the invention.
Figure 3:
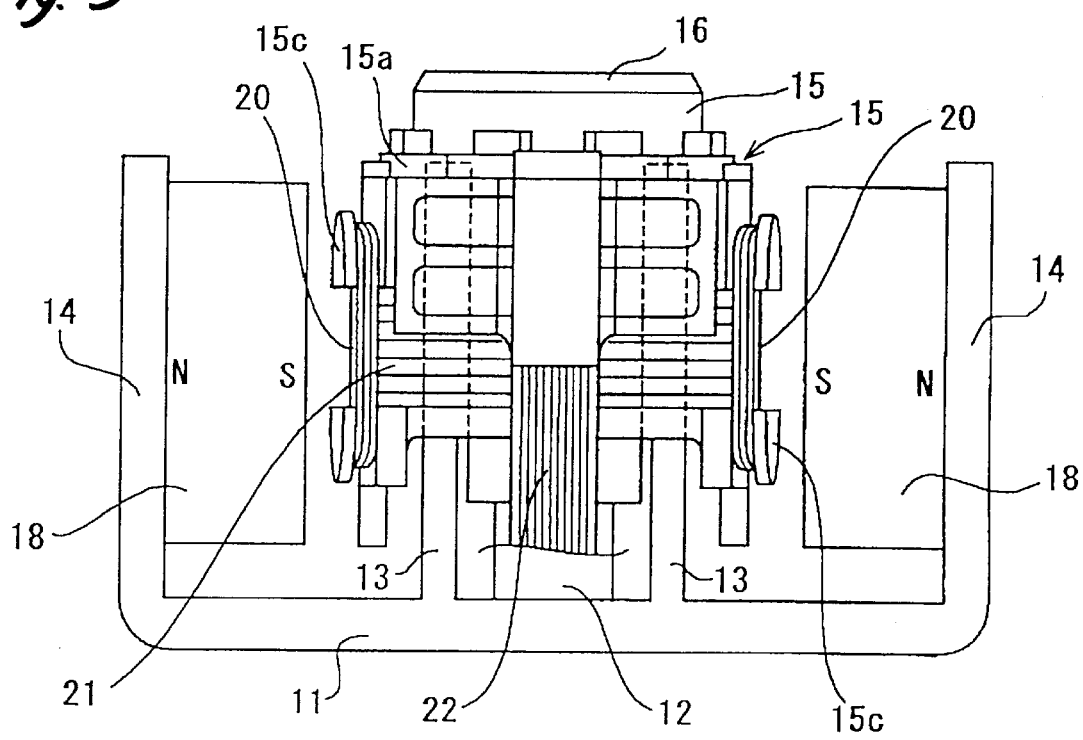
FIG. 3 is a rear view illustrating the structure of the optical pickup device according to the embodiment of the invention.

As shown in FIGS. 1, 2 and 3, a support shaft (a fixed shaft) 12 is mounted in the almost central portion of a fixed frame 11 formed of a magnetic member, and a pair of inside yokes 13 are extended in almost parallel with the support shaft 12 to rise almost perpendicularly from the fixed frame 11 in the vicinity of both sides of the support shaft 12. Moreover, a pair of outside yokes 14 are provided opposite to each other from the inside yokes 13 at regular intervals outward in a radial direction.

A shell portion 15a of a lens holder 15 is attached to the support shaft 12 swingably (rotatably) in a circumferential direction and slidably in an axial direction. A pedestal portion 15b is protruded almost horizontally from one of end portions of the shell portion 15a of the lens holder 15, and the flange portion of an objective lens 16 is stuck to the pedestal portion 15b.

The shell portion 15a of the lens holder 15 includes a hollow portion 17 in a part corresponding to the periphery of the support shaft 12. A pair of inside yokes 13 are provided to interpose the support shaft 12 on both sides in the hollow portion 17, and the wall part of the shell portion 15a of the lens holder 15 is provided between the inside yoke 13 and the outside yoke 14 and the outside wall part of the shell portion 15 is provided to face the outside yoke 14.

In this case, magnets 18 are fixed to the inner side faces of the outside yokes 14, respectively. Each of the magnets 18 is magnetized in a radial direction (a vertical direction in FIG. 1). In the present embodiment, the whole inner side face of the magnet 18 is magnetized to have the same pole as an S pole.

On the other hand, a tracking driving coil 20 is provided in the shell portion 15a of the lens holder 15 to face the magnet 18. Two pairs of tracking driving coils 20, that is, four tracking driving coils 20 are provided on side wall faces for both wall faces of the shell portion 15a which are opposite to the magnets 18 and are wound around four reel portions 15c provided in the shell portion 15a, respectively. The winding direction is set such that a pair of tracking driving coils 20 on one of sides are wound in the same direction longitudinally in almost parallel with the wall face of the shell portion 15a which is opposite to the magnet 18.

On the other hand, a focusing driving coil 21 is wound around the peripheral side face of the shell portion 15a of the lens holder 15 rectangularly in an almost horizontal plane to annularly surround the support shaft 12.

Moreover, a conduction line 22 for supplying a control current to the tracking driving coil 20 and the focusing driving coil 21 is extended from the rear end portion (the right end portion of FIG. 1) of the shell portion 15a of the lens holder 15, and the control current is supplied in a proper timing through the conduction line 22. Consequently, the whole lens holder 15 including the objective lens 16 is controlled and moved in a focusing direction (an axial direction) and a tracking direction (a rotating direction).

Furthermore, a magnetic piece 23 is attached to the faces of the shell portion 15a of the lens holder 15 which are opposite to the magnets 18. Two magnetic pieces 23 are fixed to one of the side faces of the shell portion 15a, that is, four magnetic pieces 23 are fixed in total, and are provided to be elongated in the axial direction (focusing direction) of the support shaft 12 in a portion between a pair of focusing driving coils 21 on one of the sides.

In more detail, the magnetic piece 23 is provided in such a position as to face the almost central portion of the magnet 18 in the tracking direction, and two magnetic pieces 23 on one of the sides are provided at a regular interval in the focusing direction to be the axial direction (vertical direction in FIG. 2) as shown in FIG. 2. The two magnetic pieces 23 on one of the sides are provided aside toward both edges (upper and lower edges in FIG. 2) in the focusing direction (axial direction) of the magnet 18. In the case in which the lens holder 15 is set in a neutral position, the outside edges (upper and lower edges in FIG. 2) of the upper and lower magnetic pieces 23 in the focusing direction are provided to be almost coincident with the outside edges (upper and lower edges in FIG. 2) in the focusing direction of the magnet 18.

In the present embodiment, particularly, the two magnetic pieces 23 on one of the sides have lengths which are almost equal to or greater than a moving stroke in the focusing direction of the lens holder 15. Consequently, the upper and lower magnetic pieces 23 always face each other without getting out of the magnet 18 within the whole control movement range in the focusing direction of the objective lens 16.

According to the optical pickup device in accordance with the invention, the magnetic piece 23 is provided on the almost central portion of the magnet 18 in the tracking direction (rotating direction). Therefore, the magnetic piece 23 is attracted by a magnetic attraction and is held in the almost central portion of the magnet 18 which is the closest to the magnet 18 in the locus of the tracking movement (rotation) of the magnetic piece 23.

On the other hand, the magnetic pieces 23 are provided in the vicinity of both edge portions in the focusing direction of the magnet 18. Therefore, the lens holder 15 is held in the balance position of the magnetic attractions for both magnetic pieces 23.

In the present embodiment, particularly, when the lens holder 15 is set in the neutral position, the outside edges (upper and lower edges in FIG. 2) in the focusing direction of the two magnetic pieces 23 on one of the sides are provided to be almost coincident with the outside edges (upper and lower edges in FIG. 2) in the focusing direction of the magnet 18. During the control operation in the focusing direction, when the magnetic piece 23 on one of the sides partially gets out of the facing region of the magnet 18 and the magnetic piece 23 on the other side enters the facing region on the central side of the magnet 18, the whole lens holder 15 is stably returned to the neutral position by a great magnetic attraction acting on a part of the magnetic piece 23 on one of the sides which gets out of the facing region of the magnet 18. If there is provided only the magnetic piece 23 on the other side which enters the facing region on the central side of the magnet 18, it is hard to return to the neutral position.

Figure 4:
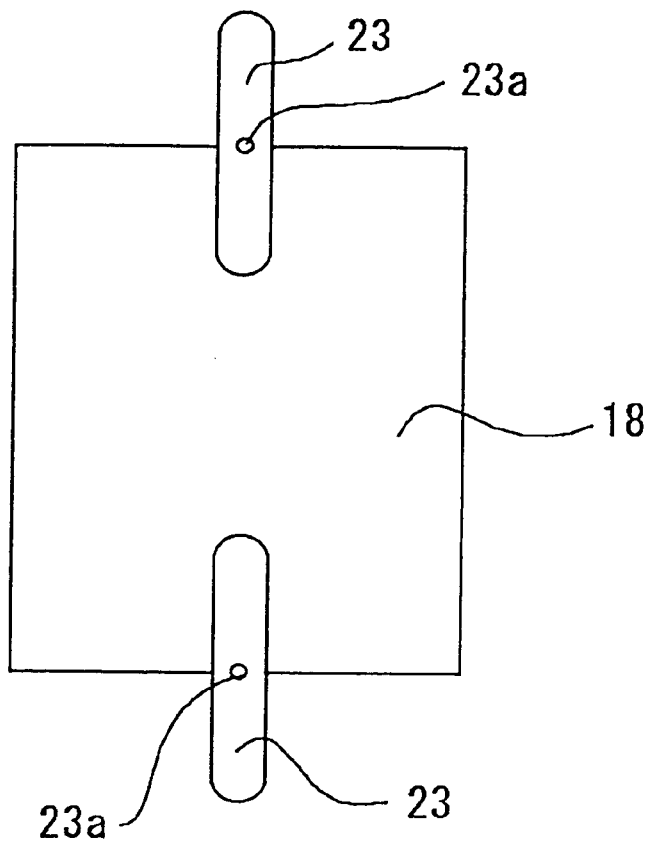
FIG. 4 is a partially enlarged side view illustrating a main part according to another embodiment of the invention.
Figure 5:
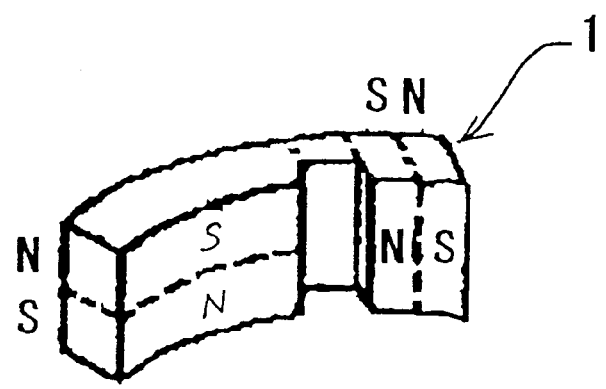
FIG. 5 is a perspective view illustrating the appearance of the structure of a magnet used for a related shaft sliding type optical pickup device.
Figure 6:
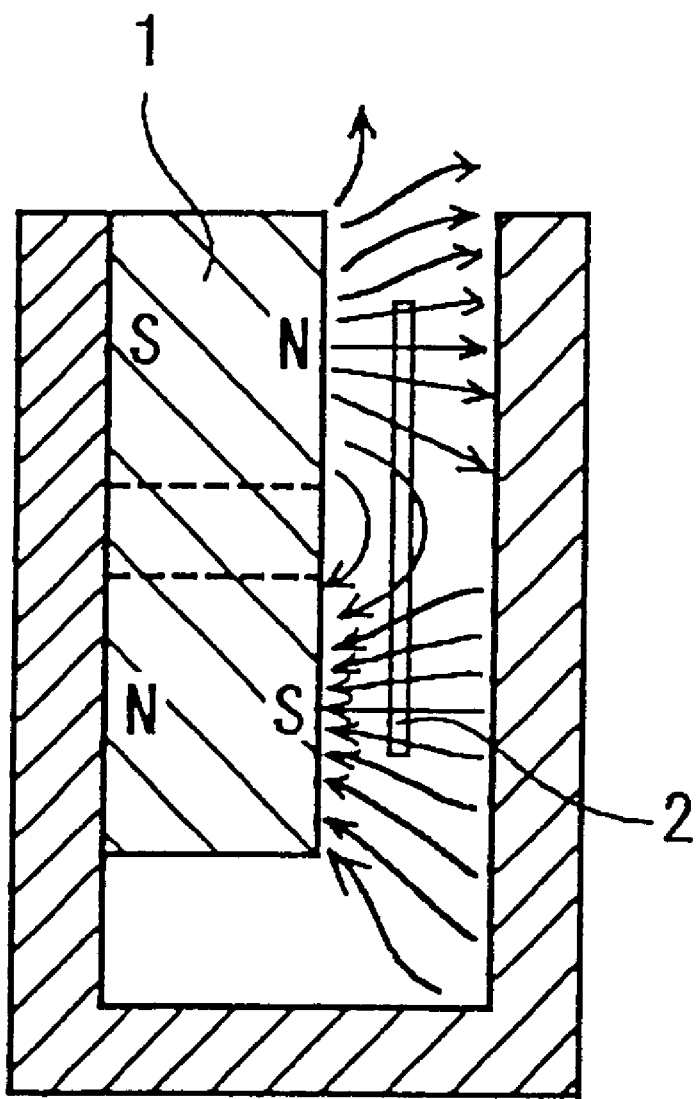
FIG. 6 is a side view illustrating the arrangement relationship of magnetic pieces used for the related shaft sliding type optical pickup device.

The function according to the present embodiment can also be obtained by providing a central position 23a in the focusing direction of each magnetic piece 23 arranged on both end portions in the focusing direction to be almost coincident with the outside edge in the focusing direction of the magnet 18 if the lens holder 15 is set in the neutral position as shown in FIG. 4, for example.

In the embodiment, if a pair of magnetic pieces 23 are provided on both end portions in the focusing direction to face the magnet 18 within the whole control movement range in the focusing direction of the objective lens 16, return force to the neutral position is always maintained to be equal so that a very stable focusing control operation can be obtained.

While the invention made by the present inventor has specifically been described based on the embodiment, it is apparent that the invention is not restricted to the embodiment but can be variously modified without departing from the scope thereof. For example, three or more magnetic pieces may be provided on one of the sides in place of the two magnetic pieces 23 on one of the sides.

Moreover, it is apparent that the optical pickup device according to the invention can also be applied to optical pickup devices for a variety of recording media such as a CD or a magneto-optic disc.

As described above, according to the optical pickup device in accordance with the invention, the magnetic pieces are provided in the almost central portion of the magnet in the tracking direction. Therefore, the magnetic piece is attracted to the almost central portion of the magnet by the magnetic attraction of the magnet and is held therein. In addition, when the lens holder is held in the neutral position in the focusing direction, the magnetic pieces are provided in the vicinity of the both edge portions in the focusing direction of the magnet, respectively. Therefore, the lens holder is held in the balance position of the magnetic attractions for both magnetic pieces. Also in the case in which two kinds of magnets are shared as a single magnet, an excellent magnetic spring structure can be obtained. According to the invention, therefore, it is possible to particularly simplify the structure of the shaft sliding type optical pickup device, thereby reducing a size and a thickness.

What is claimed is:

1. An optical pickup device comprising:

a support shaft mounted on a frame body;

a lens holder holding an objective lens, the lens holder attached onto the support shaft so as to be rotatable about the support shaft which is a tracking direction of the objective lens and slidable along the support shaft which is a focusing direction of the objective lens;

a magnetic circuit constituted by a drive coil and a magnet facing with each other with regard to a radial direction of the support shaft; and at least two magnetic pieces disposed in the magnetic circuit so as to face to the magnet with regard to the radial direction of the support shaft, for controlling an attitude of the lens holder to hold the objective lens in a neutral position with regard to both of the focusing direction and the tracking direction;

wherein the magnet is magnetized such that the whole face thereof facing to the magnetic pieces has a single pole; and wherein the magnetic pieces are arranged so as to situate in the vicinity of both end portions of the magnet with regard to the focusing direction and an almost central portion thereof with regard to the tracking direction when the lens holder is held in the neutral position.

2. The optical pickup device as set forth in claim 1, wherein the magnet is provided as a single magnet serving as a focusing magnet and a tracking magnet.

3. The optical pickup device as set forth in claim 1, wherein each of the magnetic pieces is arranged such that an end portion thereof in the focusing direction is almost coincident with the end portion in the focusing direction of the magnet when the lens holder is held in the neutral position.

4. The optical pickup device as set forth in claim 1, wherein each of the magnetic pieces is arranged such that a central portion thereof in the focusing direction is almost coincident with the end portion in the focusing direction of the magnet when the lens holder is held in the neutral position.

5. The optical pickup device as set forth in claim 1, wherein each of the magnetic pieces is arranged so as to face the magnet within a whole control movement range in the focusing direction.

6. The optical pickup device as set forth in claim 1, wherein an interval of the magnetic pieces in the focusing direction is determined in accordance with a desired magnetic spring characteristic.

* * * * *